Feb. 26, 1952　　　　B. A. HOWE　　　　2,587,160
AUTOMATIC STOCK CHUTE
Filed Dec. 21, 1948　　　　　　　　　　　　　4 Sheets-Sheet 1

Burdis A. Howe
INVENTOR.

BY *Clarence A. O'Brien
and Harvey B. Jackson*
Attorneys

Burdis A. Howe
INVENTOR.

Feb. 26, 1952 B. A. HOWE 2,587,160
AUTOMATIC STOCK CHUTE
Filed Dec. 21, 1948 4 Sheets-Sheet 4

Burdis A. Howe
INVENTOR.

Patented Feb. 26, 1952

2,587,160

UNITED STATES PATENT OFFICE 2,587,160

AUTOMATIC STOCK CHUTE

Burdis A. Howe, Walters, Okla.

Application December 21, 1948, Serial No. 66,456

5 Claims. (Cl. 119—99)

This invention relates generally to stock chutes and more particularly to a stock chute having means to grasp the head of the animal as it enters the chute, the animal itself tripping the grasping means which then automatically moves from inoperative to operative position.

In brief, this invention comprises a chute having an open frame with a side gate or pivoted side and an adjustable floor. At one end of the frame there is provided a sub-frame having a pair of elongated members in spaced opposed relation and pivoted to a lower portion of the sub-frame. The upper ends of these elongated members are connected by a system of levers and biased toward each other by an elongated helical spring stretched between the upper ends of the members. A yoke is pivotally secured to the sub-frame and is operated by the stock to trip the system of levers in order to release the elongated members to move toward each other and grasp the neck of the animal. Means is provided to lock the elongated members in neck-grasping position, this means operating automatically, and winch and cable means is provided for securement selectively near the bottom and near the top of the sub-frame for use in holding the head of the animal either down or in raised position when this is desired, the winch and cable means being removable from the sub-frame when not in use.

A primary object of this invention is to provide a stock chute which is largely automatic in operation, as regards manual control, whereby an animal is held securely in the chute after the animal has once entered the chute, so that branding and other operations may be performed upon the animal.

Another object of this invention is to provide a stock chute which will positively hold an animal without choking or bruising the neck of the animal.

Another object of this invention is to provide a chute which may be used alternatively for restraining stock for branding purposes and the like, as well as a loading chute, this last feature being by virtue of the adjustable floor provided in the device.

Still another object of this invention is to provide means for securely and easily holding the head of an animal in the chute in either raised or lowered position.

Yet another object of this invention is to provide a stock chute in which the sides are capable of being swung outwardly, enabling close work on the stock such as foot trimming and other operations.

And a last object to be mentioned specifically is to provide a stock chute of the type mentioned above which is relatively inexpensive and practicable to manufacture, which may be made light in weight, which is simple, safe and convenient to use under many different operating conditions, and which will give generally efficient and durable service.

With these objects definitely in view, this invention resides in certain novel features of construction, combination and arrangement of elements and portions as will be hereinafter described in detail in the specification, and particularly pointed out in the appended claims, and illustrated in the accompanying drawings which form a material part of this application, and in which:

Similar characters of reference designate similar or identical elements and portions throughout the specification and throughout the different views in the drawings.

Figure 1:
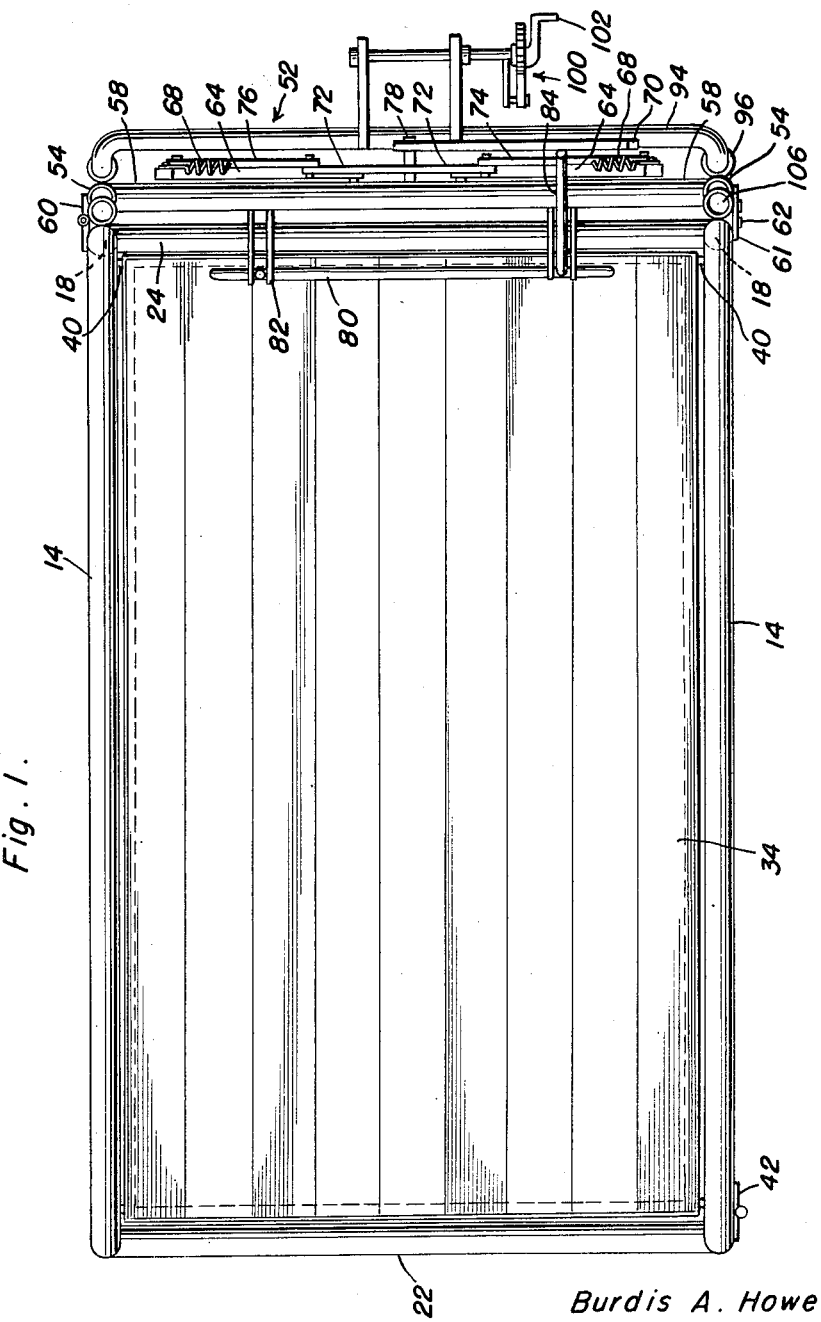
Figure 1 is a top plan view of the assembled device.

Referring now to the drawings in detail, this stock chute comprises an open frame having lower horizontal frame members 10, upper longitudinal frame members 12, rear vertical members 16 and front vertical members 18, together with a pair of inclined top members 14 extending between the members 16 and 18, the latter being of greater length, braces 20, and rear transverse frame members 22 and a front transverse frame member 24, all arranged and preferably welded together to form an open frame as illustrated in the drawings. The sides of the frame are vertical, and one side has a gate substantially coextensive therewith and hinged thereto. This gate is indicated by the numeral 26 and comprises vertical end members 28, horizontal top and lower members 30 and a plurality of vertical bars 32. A floor 34 is pivoted to the lower longitudinal frame members 10 by pins 36 which slide within short slots 38 in the members 10 near the rear ends thereof. This floor may be tilted upwardly at the forward end into the position indicated at 34' in Figure 2, and a pin 40 is used to secure the floor either in horizontal position or in the inclined position as indicated at 40'. The gate is hinged as at 42 to the corresponding rear vertical frame member 16 and the front end of the gate is provided with latch bars 44 adapted to be engaged in latch bar retaining brackets 46 secured to the corresponding front vertical frame member 18. The latch bars 44 are pivoted to the front vertical members 28 of the gate and are preferably provided in duplicate with a link 48 connecting the same and pivoted as at 50 to each of the latch bars.

Figure 2:
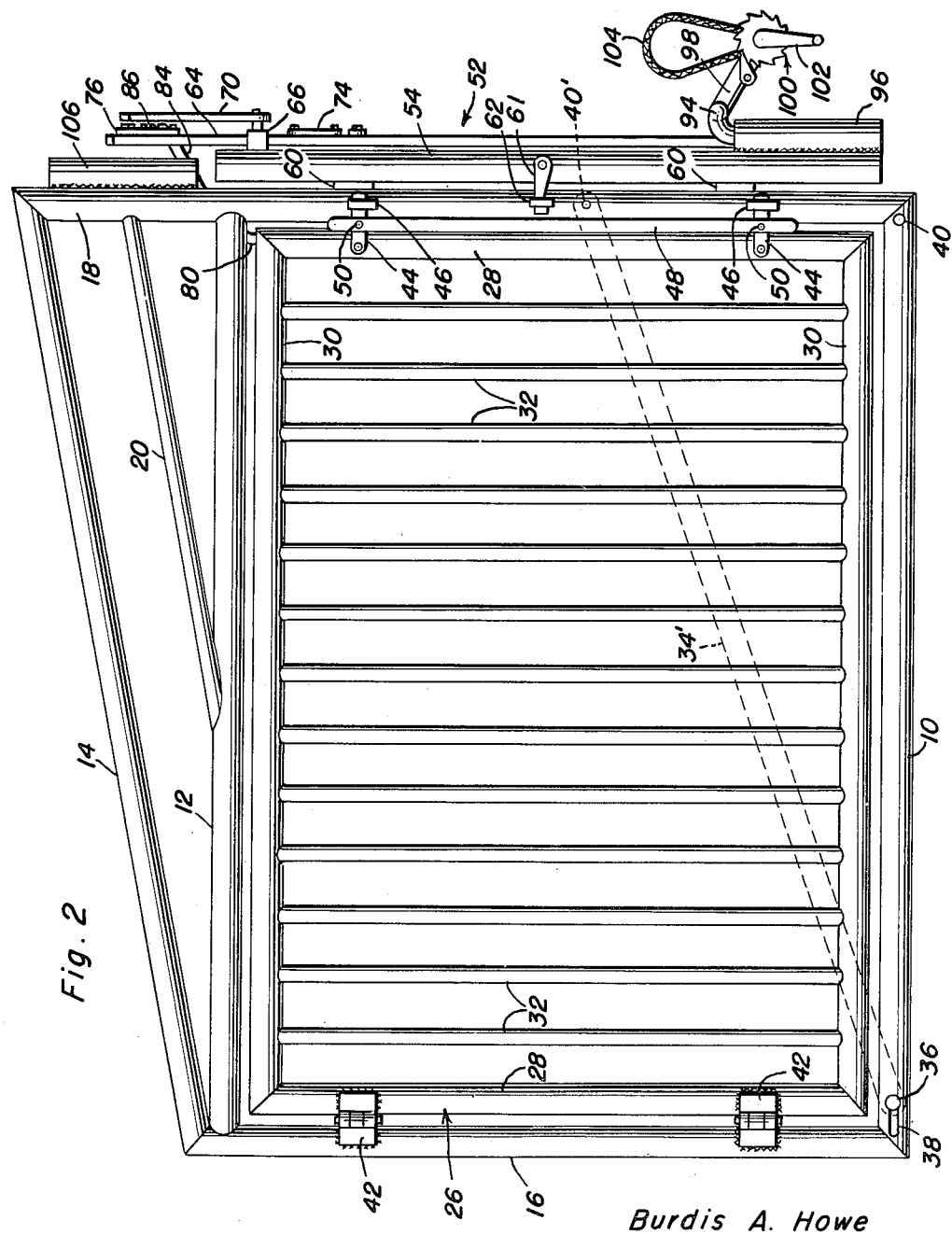
Figure 2 is a side elevational view of the assembled device, certain minor details being deleted in order to simplify the drawing and to clarify the illustration thereof.

A sub-frame generally indicated at 52 is comprised of vertical members 54 spaced apart a distance equal to the spacing of the front vertical members 18 of the main frame, lower and upper transverse members 56 and 58, and this sub-frame is hinged to the front frame members 18 as at 60. The sub-frame swings about a vertical axis and closes the forward end of the frame, and a latch bar 61 with a latch bar retaining bracket 62, best illustrated in Figure 2, is provided to hold the sub-frame in chute-closing position. A pair of inflexible elongated members 64 are pivoted at their lower ends to the transverse member 56 of the sub-frame, as indicated at 65 and a pair of straps 66 are secured to the forward side of the upper transverse member 58 of the sub-frame and the elongated members are retained against being pushed forwardly at their upper ends 67 by these straps 66, as best illustrated in Figure 3.

The upper ends 67 of the elongated members 64 are biased toward each other by a helical spring 68 terminally secured to the said upper ends, while means is provided for manually setting the elongated members 64 in retracted or diverging positions. This means includes a hand lever 70 having a pair of oppositely extending arms 72, the hand lever and arms comprising a double bell crank, and links 74 and 76 of inflexible character are pivoted on the ends of the arms 72 as indicated at 77 and 79 and the elongated members 64, at points intermediate the length of the elongated members and on opposite sides of the pivot point 78 of the double bell crank comprised of the lever 70 and arms 72. It should be particularly carefully noted that the links 74 and 76, the arms 72 and the positioning of the pivot points 73 and 75 of the links 74 and 76 on the elongated members 64 are so arranged that the arms 72 and links 74 and 76 are never colinear, thus assuring that the spring 68 may pull the upper ends 67 of the elongated members 64 together when the hand lever 70 is released. This hand lever 70 is automatically released by a yoke 80 having an arcuate integral crossbar 81 which is pivoted at two points 82 on the upper transverse member 58 of the sub-frame, the upper end of one arm of the yoke being extended upwardly and forwardly to provide an offset portion 84 having a notched terminal portion adapted to engage a tooth 86 on the lever 70, when this lever is in elevated position, as shown in Figure 3.

Figure 3:
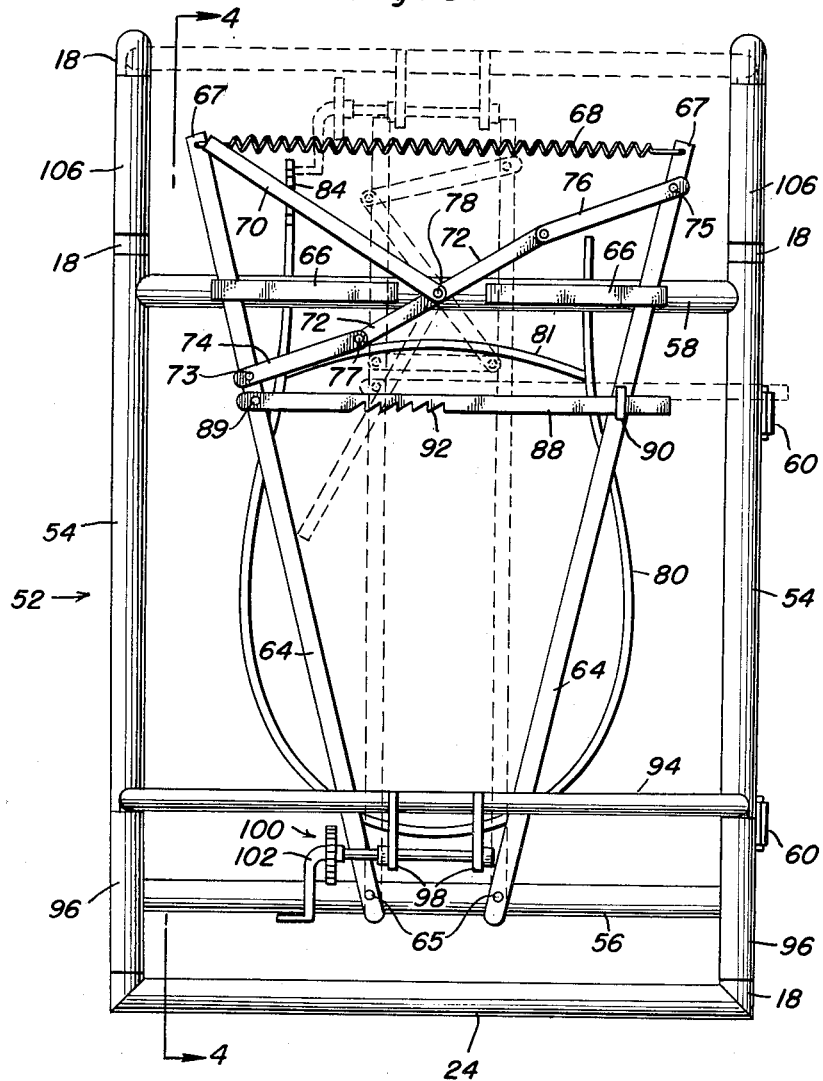
Figure 3 is a front end elevational view of the stock chute.
Figure 4:
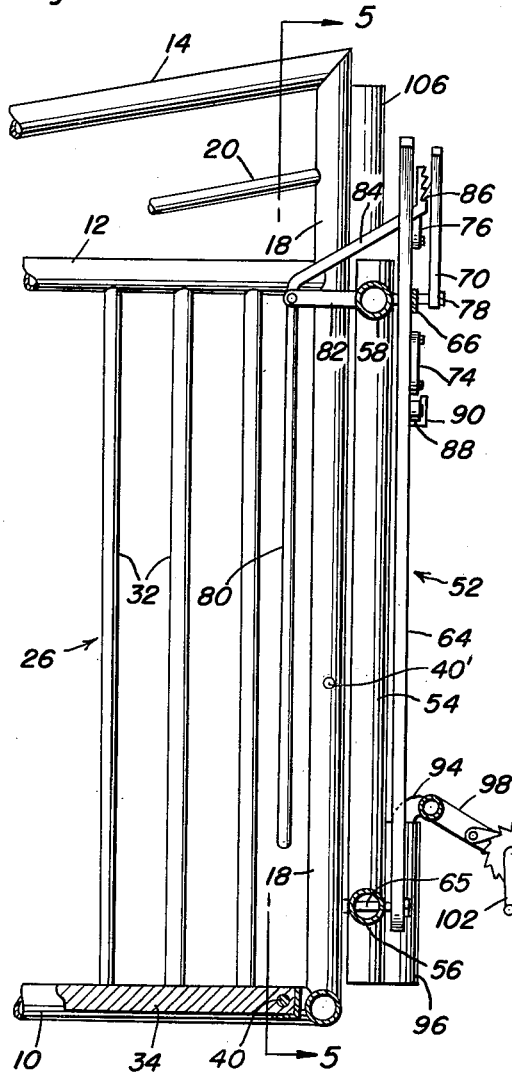
Figure 4 is a fragmentary view of a front end portion of the chute, the view being technically a vertical sectional view, taken on a line 4—4 in Figure 3.
Figure 5:
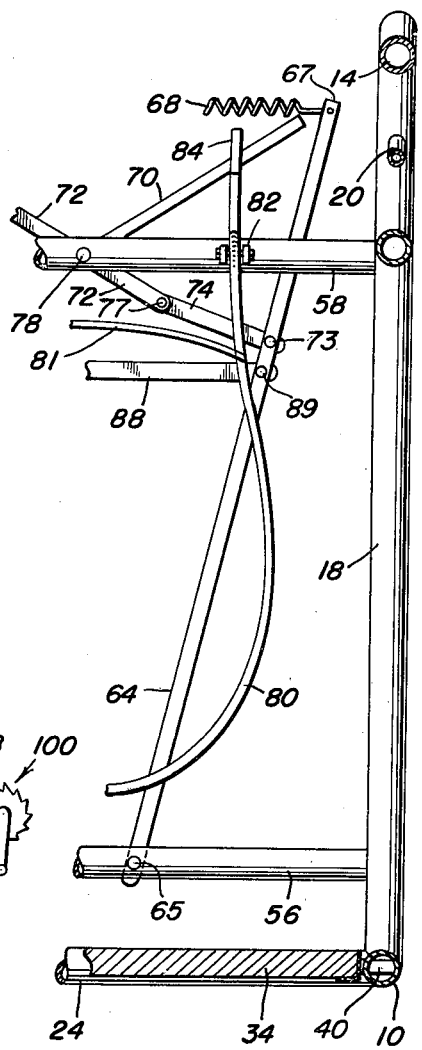
Figure 5 is a vertical sectional view, of fragmentary character, taken substantially upon the line 5—5 of Figure 4.

A latch bar 88 is pivoted at 89 to one of the elongated members 64, while the other end portion of the bar is guided by a bracket member 90 on the other of said elongated members, this bracket 90 also serving as a dog to engage teeth 92 on the lower side of the latch bar 88 when the elongated members 64 are in the positions indicated in dash line in Figure 3, that is, when the neck of the stock is being held thereby.

The means for holding the head of an animal in either depressed or raised position will now be described. An inflexible bar 94 of a length substantially equivalent to the width of the chute is provided with offset and right angularly bent portions to fit within sleeves 96 rigidly secured to the lower end portions of the vertical frame members 54. A pair of arms 98 extend from a central portion of the bar 94 to provide mountings for a winch generally indicated by the numeral 100, the details of which are not particularly material in this application, the winch being ordinarily operated by a hand crank 102. A cable 104 is secured to a fixed portion of the winch at one end, and looped outwardly from the winch with the other end secured to the winding drum portion of the winch, so that the effective lengths of the looped cable can be changed by the operation of the crank 102. Another pair of sleeves 106 are rigidly secured to the upper end portions of the frame members 18 and the bar 94 may be alternatively placed with its end portions engaged in these sleeves 106.

The operation of this invention will be clearly understood from a consideration of the mechanical details thereof, taken in connection with the drawings and with the above recited objects. In recapitulation, it may be mentioned that the stock upon entering the chute will force the lower end of the yoke 80 forwardly, tripping the lever 70 and allowing the spring to close the elongated members 64 upon the neck of the animal. Obviously the head of the animal may be lowered or raised as desired by the winch 100 and cable 104. The gate 26 may be swung outwardly when desired and the floor 34 when inclined as at 34' will allow the device to be used as a loading chute.

Minor variation from the disclosed embodiment may be resorted to without departure from the scope of this invention.

Having described the invention, what is claimed as new is:

1. A stock chute comprising an open frame having vertical sides, a floor pivoted to the bottom of the chute at one end of the chute for movement about a horizontal axis an end closure assembly including a sub-frame having sides and hinged to a lower portion of one of said vertical sides at the end of the chute remote from said one end, a pair of opposed elongated members pivoted to the side of a lower portion of said sub-frame remote from said one end and adapted dimensionally and positionally with respect to the sides to engage the necks of stock when the upper end portions are collapsed toward each other, straps secured to said sub-frame to prevent the upper ends of said members from being pushed outwardly by stock, spring means connected to said members to bias said members into collapsed positions, latch means to hold said members in collapsed positions, other means connecting said members to hold said members in retracted positions comprising a hand lever having a pair of oppositely extending arms, inflexible links pivotally secured to and between said arms and upper portions of said members, and trip means operable by the stock to release said hand lever so that said members are freed to collapse together under the influence of said spring means.

2. A chute according to claim 1 and wherein said latch means is a bar having notches and pivoted on one of said members, and a bracket member on the other of said members for slidably receiving said bar and selectively engaging said notches, said bar being manually shiftable in said bracket member to release the bar so that the elongated members can be retracted.

3. A chute according to claim 2 and wherein said trip means comprises a member pivoted on said sub-frame and releasably latching said hand lever in the position assumed thereby when said elongated members are in retracted positions.

4. A stock chute according to claim 1 and including a winch and a looped cable operatively connected thereto secured to the chute at a point vertically spaced from the central portion of said end closure assembly, whereby the heads of stock in the chute may be pulled upwardly or downwardly.

5. A stock chute according to claim 1 and wherein one of said sides has a gate substantially coextensive with the side and hinged thereto.

BURDIS A. HOWE.

REFERENCES CITED

The following references are of record in the file of this patent:

UNITED STATES PATENTS

| Number | Name | Date |
|---|---|---|
| 497,163 | Boman et al. | May 9, 1893 |
| 781,357 | Pentecost | Jan. 31, 1905 |
| 1,554,566 | Egger | Sept. 22, 1925 |
| 1,897,441 | Robertson | Feb. 14, 1933 |
| 2,396,928 | Parsons | Mar. 19, 1946 |

FOREIGN PATENTS

| Number | Country | Date |
|---|---|---|
| 101,327 | Switzerland | Sept. 27, 1923 |